(No Model.)

C. DICKINSON.
BLAST REGULATOR FOR FANNING MACHINES, &c.

No. 324,242. Patented Aug. 11, 1885.

Witnesses
Robert Everett.
George W. Rea

Inventor:
Charles Dickinson,
By James L. Norris
Atty.

UNITED STATES PATENT OFFICE.

CHARLES DICKINSON, OF CHICAGO, ILLINOIS.

BLAST-REGULATOR FOR FANNING-MACHINES, &c.

SPECIFICATION forming part of Letters Patent No. 324,242, dated August 11, 1885.

Application filed November 25, 1884. (No model.)

*To all whom it may concern:*

Be it known that I, CHARLES DICKINSON, a citizen of the United States, residing at Chicago, Illinois, have invented new and useful Improvements in Blast-Regulators for Fanning, Thrashing, and other Analogous Machines, of which the following is a specification.

My invention relates to air-blast regulators for fanning, thrashing, and other analogous machines, whereby the volume of the air-current may at all times be controlled without regard to the speed of the fan.

It is the object of my invention to combine with machines of the class mentioned valves located at or near the ends of the fan-shaft and having simultaneous adjustment whereby the air-openings are contracted or enlarged, the adjacent edges of the valves being at all times parallel to each other, and the openings formed by them being of equal width at every point.

The invention consists in the several novel features of construction and combinations of parts hereinafter fully described, and definitely pointed out in the claims following this specification.

Figure 1:
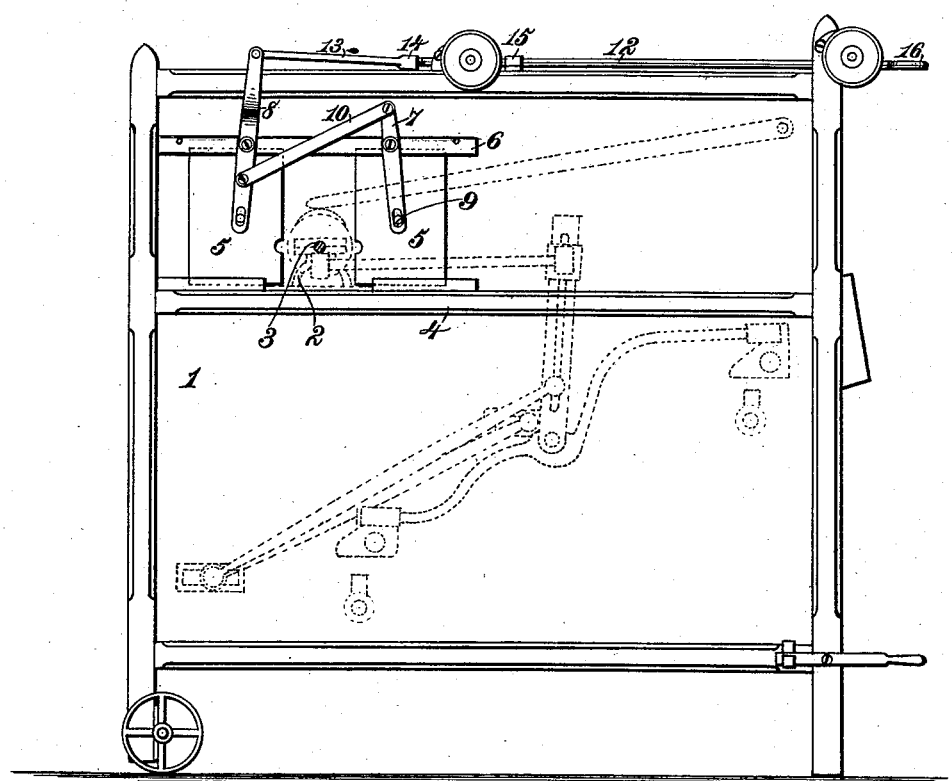
Figure 2:
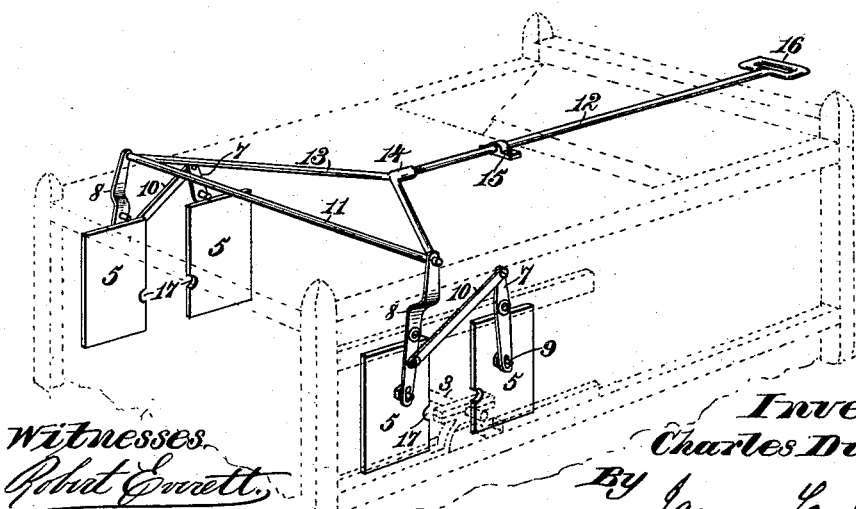

Referring to the drawings forming part of this application, Figure 1 is a side elevation of a machine in which my invention is embodied. Fig. 2 is a perspective view of the air-valves, together with their connections, the outline of the machine being indicated in dotted lines.

In the said drawings the reference-numeral 1 denotes the frame or casing of the machine, which in all essential respects is of the known construction. Within suitable bearings, 2, is journaled the shaft 3, carrying the fan or blower by which the air-current is created, the bracket-bearings 2 being preferably mounted outside the casing 1 and supported by a horizontal brace, 4.

In the walls of the casing are formed openings of any suitable size, through which the ends of the fan-shaft 3 project. These openings may be circular or of any proper shape, and they are each closed, either wholly or in part, by valves or gates 5, sliding toward and from each other in suitable guides mounted upon the machine-casing. The guides may consist of rabbeted cleats 6, within which the ends of the valves slide, and they have preferably a horizontal arrangement above and below the air-openings.

Upon the upper of these guides, at each side of the machine, are pivoted two levers, 7 and 8, each connected by its lower slotted extremity to a stud, 9, upon the valve lying beneath it. The upper end of the lever 7, which is extended somewhat above the pivotal point, receives one end of a toggle or link, 10, having its other end pivoted upon the lever 8 at a corresponding distance below the pivotal support of the latter. The said lever 8 is extended above its pivot sufficiently to project slightly above the casing of the machine, and is connected by a transverse rod, 11, to the corresponding lever upon the opposite side of the machine. The connecting-rod 11 is united to a central actuating-rod, 12, by a yoke, 13, having a coupling, 14, into which the rod 12 is tapped. The latter rod may be guided by a half-box, 15, or any suitable device, and is provided at its end with a handle, loop, knob, or similar device, 16, which lies near the end of the machine within convenient reach.

It will readily be seen that by actuating the rod 12 in the direction of its length the valves or gates 7 and 8, upon both sides of the machine, will be simultaneously adjusted toward or from each other, thereby contracting or enlarging the air-openings, in front of which they slide to any desired degree, such contraction or enlargement being not only equal upon both sides, but each opening being of equal width at all points between the ends of the valves.

A semicircular opening, 17, is formed in the edge of each valve to receive the fan-shaft when the valves are thrown toward each other, and permit their closing tight.

By this mechanism I am able to control the air-blast perfectly. The apparatus by which the valves are actuated is simple, and is operated with great ease, and may be used without essential change in all machines wherein it is desired to regulate the volume of the air-current and graduate the same to the speed of the fan.

What I claim is—

1. In a fanning, thrashing, or other analogous machine, the combination, with the fan or blower, of sliding valves or gates and a casing having air-openings upon each side of the machine, pivoted levers and toggles or links, said pivoted levers having their ends connected to said valves and connected to each other above and below their pivotal points by said toggles or links, substantially as described.

2. In a fanning, thrashing, or other analogous machine, the combination, with the fan or blower, a casing having air-openings, and a shaft which projects through said air-openings in each side of the casing, of sliding valves or gates, slotted levers pivoted to suitable supports and having their slotted ends connected with said valves, toggle bars or links connecting said levers above and below their pivotal points, a transverse rod connected to the corresponding opposite extended levers, and a centrally-arranged actuating-rod, substantially as described.

3. In a fanning, thrashing, or other analogous machine, the combination, with a casing provided with air-openings, and sliding valves or gates arranged upon each side of the fan-shaft, of the slotted pivoted levers 7 and 8, studs upon the valves, a toggle, 10, pivoted to the levers above and below their points of support, a transverse rod, 11, connecting the corresponding levers upon opposite sides of the machine, an actuating-rod, 12, and a yoke, 13, substantially as described.

In testimony whereof I affix my signature in presence of two witnesses.

CHAS. DICKINSON.

Witnesses:
JAMES L. NORRIS,
J. A. RUTHERFORD.